United States Patent
Sakai et al.

(10) Patent No.: US 8,952,673 B2
(45) Date of Patent: Feb. 10, 2015

(54) CONTROL DEVICE, A CONTROL METHOD, AND A NON-TRANSITORY COMPUTER READABLE MEDIUM THEREOF

(75) Inventors: Yumiko Sakai, Kanagawa-ken (JP); Yusuke Doi, Kanagawa-ken (JP); Kotaro Ise, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 185 days.

(21) Appl. No.: 13/608,395

(22) Filed: Sep. 10, 2012

(65) Prior Publication Data

US 2013/0257179 A1    Oct. 3, 2013

(30) Foreign Application Priority Data

Mar. 30, 2012 (JP) ................ P2012-082855

(51) Int. Cl.
*G05F 5/00* (2006.01)

(52) U.S. Cl.
USPC ........................................... 323/299

(58) Field of Classification Search
CPC ........ H02J 3/14; H02J 13/2006; H01H 47/00; Y02B 70/3266
USPC .................. 323/266, 268, 299; 713/300, 320; 324/140 R, 141
See application file for complete search history.

(56) References Cited

U.S. PATENT DOCUMENTS

| | | | | |
|---|---|---|---|---|
| 8,181,047 B2* | 5/2012 | Lee | ............................... | 713/320 |
| 8,476,895 B2* | 7/2013 | Higuma et al. | ............... | 324/142 |
| 2011/0282505 A1 | 11/2011 | Tomita et al. | | |
| 2012/0078427 A1* | 3/2012 | Jang et al. | ...................... | 700/291 |
| 2013/0339764 A1* | 12/2013 | Lee et al. | ...................... | 713/300 |

FOREIGN PATENT DOCUMENTS

| | | | |
|---|---|---|---|
| JP | 2008-104310 | * | 5/2008 |
| JP | 2009-153336 | * | 7/2009 |
| JP | 2010-166636 | | 7/2010 |

* cited by examiner

*Primary Examiner* — Matthew Nguyen
(74) *Attorney, Agent, or Firm* — Nixon & Vanderhye, P.C.

(57) ABSTRACT

According to one embodiment, a control device communicates with a power measurement device. The control device includes a communication unit, a threshold storage, a calculation unit, and a control unit. The communication unit is configured to receive a usable electric power from the power measurement device. The threshold storage stores a first threshold. The calculation unit is configured to calculate a usable electric energy by integrating the usable electric power. The control unit is configured to change an operation status of the control device based on a comparison result between the usable electric energy and the first threshold.

8 Claims, 5 Drawing Sheets

CONTROL DEVICE, A CONTROL METHOD, AND A NON-TRANSITORY COMPUTER READABLE MEDIUM THEREOF

CROSS-REFERENCE TO RELATED APPLICATION

This application is based upon and claims the benefit of priority from Japanese Patent Application No. 2012-082855, filed on Mar. 30, 2012; the entire contents of which are incorporated herein by reference.

FIELD

Embodiments described herein relate generally to a control device and a control method for adjusting an electric power, and a non-transitory computer readable medium thereof.

BACKGROUND

In order to balance supply and demand of an electric power, a control mode for a customer to subjectively meet a request of supply and demand adjustment from an electric power system, which is called a demand-response, is well known. As to the customer having a plurality of home appliances, in order to execute the demand-response, a method for controlling each device with communication is used. Here, a power measurement device having a communication function collects various information (such as a correspondence relationship between operation status and power consumption, a user setting, the present power consumption) from each device (such as an air conditioner, an illumination). When the electric power system generates a request of supply and demand adjustment, in response to this request, the power measurement device transmits an operation control signal to each device.

In this method, in order to cope with variation of combination of various devices and change of component due to addition or deletion of device, the power control device transmits/receives many parameters with each device, determines a plan to adjust the electric power, and transmits a control instruction thereof. In this case, even if the power consumption momentarily rises, the power control device often adjusts the electric power.

However, as to the device actually operating, fixed power consumption is not always maintained in a certain operation status. Briefly, it often happens that the power consumption momentarily rises. In this case, when a usable electric power is below a threshold, even if the usable electric power is above the threshold at a next moment, adjustment of the electric power is performed. Here, a method for returning the electric power to a original status thereof is same as a method for controlling congestion. Accordingly, after adjustment of the electric power is performed once, comfortableness is damaged for a while.

DETAILED DESCRIPTION

According to one embodiment, a control device communicates with a power measurement device. The control device includes a communication unit, a threshold storage, a calculation unit, and a control unit. The communication unit is configured to receive a usable electric power from the power measurement device. The threshold storage stores a first threshold. The calculation unit is configured to calculate a usable electric energy by integrating the usable electric power. The control unit is configured to change an operation status of the control device based on a comparison result between the usable electric energy and the first threshold.

Various embodiments will be described hereinafter with reference to the accompanying drawings.

Figure 1:
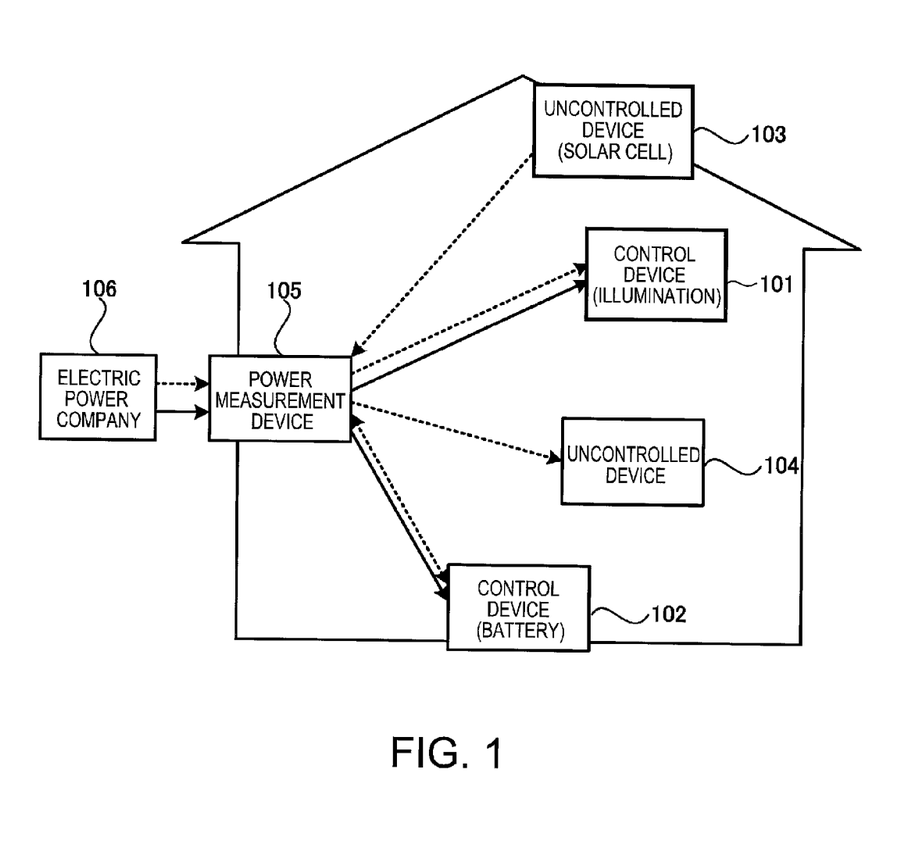
FIG. 1 is a block diagram of a system according to one embodiment.

A system having a control device of one embodiment is explained by referring to FIG. 1. FIG. 1 is a block diagram of the system. In the present embodiment, as a customer, one house is imaged and explained.

As shown in FIG. 1, the system includes control devices (For example, 101, 102), uncontrolled devices (For example, 103, 104), a power measurement device 105, and an electric power company 106.

A control device and an uncontrolled device are distinguished by existence of a communication function. Briefly, the control device has a function to communicate with the power measurement device 105. The uncontrolled device does not have a function to communicate with the power measurement device 105. The control device and the uncontrolled device are home appliances (for example, an air conditioner, an illumination) and energy devices (For example, a solar cell, a battery, a fuel cell) in a house. A plurality of control devices and a plurality of uncontrolled devices may exist. In FIG. 1, a flow of communication is represented by a solid line, and a flow of electric power is represented by a broken line. The power measurement device 105 is explained by referring to FIG. 2 afterwards.

As a basic instance in the system of FIG. 1, the electric power company 106 requests one house having a plurality of home appliances and energy devices to adjust supply and demand. In the present embodiment, a request of supply and demand adjustment is represented as "a restriction is set to a maximum of a usable electric power in one house". Whether to accept the request of supply and demand adjustment, and how to determine a maximum of usable electric power in case of acceptance, are previously agreed and contracted between the electric power company 106 and a customer. When the electric power company 106 issues a request of supply and demand adjustment, for example, the customer automatically performs operation such as change of temperature for the air conditioner, adjustment of intensity for the illumination, or discharge of a battery previously charged. Briefly, a power consumption of the house is lowered to be below a maximum of the usable electric power.

(Flow of Electric Power)

A flow of the electric power in the present embodiment is explained. An electric power supplied from the electric power company 106 is provided for each control device 101, 102, and each uncontrolled device 103, 104 via the power measurement device 105 (For example, an electric power meter, a distribution board) in the house. Between the power measurement device 105 and each device, an electric power converter such as a power conditioner may be interposed. In the power measurement device 105, power incoming and power distribution of the electric power are general function realized at an existing power meter or distribution board. Accordingly, detail explanation thereof is omitted.

The control devices 101, 102, and the uncontrolled devices 103, 104, respectively communicate electric power information with the power measurement device 105. Accordingly, a power consumption in a house is measured as a sum (an electric power generated from the house is subtracted from a total of power consumption of the house) of the control devices 101, 102, and the uncontrolled devices 103, 104 by the power measurement device 105. This measurement function is a general function realized as measurement of the electric power purchased from the electric power company 106 in the power meter, or measurement of the power consumption of a main breaker in the distribution board. Accordingly, detail explanation thereof is omitted.

Operation status of the control devices 101, 102, and the uncontrolled devices 103, 104 change by decision of respective devices or a user's operation. In accordance with this change, the power consumption measured by the power measurement device 105 increases or decreases.

(Flow of Communication)

A flow of communication in the present embodiment is explained. A request of supply and demand adjustment transmitted from the electric power company 106 is received by the power measurement device 105 of each house. The power measurement device 105 communicates with the control devices 101, 102, and the control devices 101, 102 perform control to meet the request of supply and demand adjustment. On the other hand, the uncontrolled devices 103, 104 do not respectively have communication function. Accordingly, irrespective of whether to generate the request of supply and demand adjustment, the uncontrolled devices 103, 104 regularly operate. For example, while the request of supply and demand adjustment is being generated, the uncontrolled devices 103, 104 start operating by a user's indication.

Figure 2:
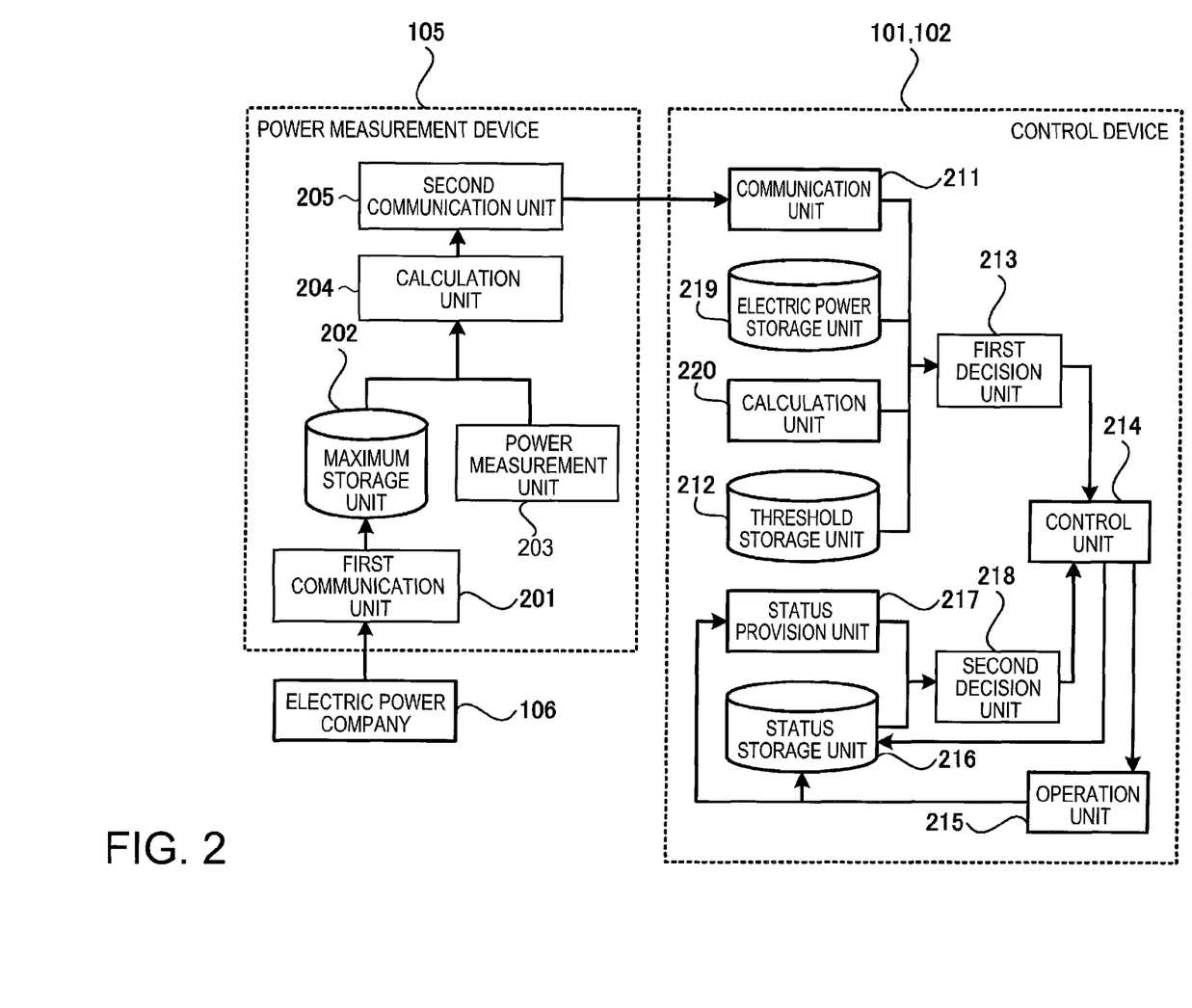
FIG. 2 is a block diagram of a power measurement device and a control device in FIG. 1.

Next, the power measurement device 105 and the control devices 101, 102 are explained by referring to FIG. 2. FIG. 2 is a functional block diagram of the power measurement device 105 and the control devices 101, 102 in FIG. 1.

(The Power Measurement Device 105)

As shown in FIG. 2, the power measurement device 105 includes a first communication unit 201, a maximum storage unit 202, a power measurement unit 203, a calculation unit 204, and a second communication unit 205. The first communication unit 201 receives a request of supply and demand adjustment from the electric power company 106. In response to the request received by the first communication unit 201, the maximum storage unit 202 stores information of a maximum of usable electric power. This information of the maximum may be stored in not only the power measurement device 105 but also respective control devices 101, 102.

The power measurement unit 203 measures a power consumption of the customer at the present time. The power consumption is calculated by subtracting a total of electric power generation (discharged electric power) from a total of power consumptions of all devices (including the control devices 101, 102, and the uncontrolled devices 103, 104). The power consumption of the control devices 101, 102 may be measured by respective control devices, and provided for the power measurement device 203.

The calculation unit 204 calculates a value by subtracting the present power consumption (measured by the power measurement device 203) from the maximum of usable electric power (stored in the maximum storage unit 202). The value represents an electric power usable by the customer from the present time. Hereinafter, this value is called "a usable electric power".

The second communication unit 205 transmits the usable electric power (calculated by the calculation unit 204) to the control devices 101, 102.

(The Control Devices 101, 102)

As shown in FIG. 2, the control devices 101, 102 respectively include a communication unit 211, a threshold storage unit 212, a first decision unit 213, a control unit 214, an operation unit 215, a status storage unit 216, a status provision unit 217, a second decision unit 218, an electric power storage unit 219, and a calculation unit 220. Hereinafter, as a typical example, the control device 101 is only explained, which is same as the control device 102.

The communication unit 211 receives a usable electric power transmitted from the second communication unit 205 of the power measurement device 105. The communication unit 211 receives the usable electric power at a predetermined interval. Regularly, whenever the communication unit 211 receives the usable electric power at a predetermined interval, the control device 101 performs following operation. For example, whenever the communication unit 211 receives the usable electric power, the first decision unit 213, the control unit 214, the operation unit 215 and the second decision unit 218, perform following operation.

The electric power storage unit 219 stores the usable electric power (received by the communication unit 211) in a certain period (For example, five minutes). When a new usable electric period is received from the communication unit 211, the electric power storage unit 219 deletes the oldest usable electric power.

The calculation unit 220 acquires a plurality of usable electric powers continually stored in the electric power storage unit 219, and calculates by integrating the plurality of usable electric powers in a certain period. Hereinafter, this integrated value is called "a usable electric energy".

The threshold storage unit 212 stores a threshold determined for respective control devices. The threshold is compared with the usable electric power or the usable electric energy. By deciding whether the threshold is larger than the usable electric power, the electric power to be consumed by the control device 101 is changed. This threshold is also explained in "(Operation of the control devices 101, 102)".

The first decision unit 213 compares the usable electric energy (calculated by the calculation unit 220) with a first threshold stored in the threshold storage unit 212. Furthermore, the first decision unit 213 compares the usable electric power (received by the communication unit 211) with a second threshold stored in the threshold storage unit 212. Here, the usable electric energy is compared with the first threshold, and the usable electric power is compared with the second threshold. However, the first decision unit 213 may compare the usable electric power (received by the communication unit 211) with the first threshold stored in the threshold storage unit 212.

Based on the comparison result by the first decision unit 213 and the second decision unit 218, the control unit 214 indicates the operation unit 215 to change an operation status of the control device 101. This indication is explained in "(Operation of the control devices 101, 102)".

The operation unit 215 is a mechanical structure of the control device 101, and changes an operation status based on an indication from the control unit 214. For example, the operation unit 215 darkens an intensity of the illumination, or gradually brightens the intensity of the illumination. Furthermore, the operation unit 215 provides information of the status changed based an indication from the control unit 214, for the status provision unit 217.

The status provision unit 217 acquires present information of the operation status of the control device 101 from the operation unit 215, and provides the information for the second decision unit 218. Here, the operation status is, for example, a temperature set to an air conditioner, an intensity of the illumination, or discharge/charge of the buttery. Briefly, based on the operation status, the power consumption or the power generation of the control device 101 can be changed. The status provision unit 217 stores information of the operation status of the control device 101 at a certain timing by observation of the operation unit 215, and provides the information for the second decision unit 218. Timing when the status information is stored is explained afterwards.

When the power consumption is lowered by the control unit 214, the status storage unit 216 stores information of the operation status just before the power consumption is lowered. When the control unit 214 decides to lower the power consumption, before the control unit 214 outputs this indication to the operation unit 215, the control unit 214 outputs a trigger signal to the status storage unit 216. At timing when the trigger signal is received, the status storage unit 216 stores the latest information of the operation status from the operation unit 215. Contrary speaking, when the status storage unit 216 does not receive the trigger signal, the status storage unit 216 need not store information of the operation status from the operation unit 215. For example, the status storage unit 216 temporarily stores one of the latest information of the operation status, and formally stores this information when the trigger signal is received. As a result, the status storage unit 216 can store information of the operation status just before the power consumption is lowered.

By using another method thereof, the status storage unit 216 may store information of the operation status. For example, the operation unit 215 includes one buffer to store information of previous operation status. Briefly, in response to a new indication from the control unit 214, the operation unit 215 stores information of the operation status as a previous indication. Then, when the control unit 214 decides to lower the power consumption and outputs a trigger signal to the operation unit 215, in response to the trigger signal, the operation unit 215 makes the status storage unit 216 store information of the previous operation status. In this case, the trigger signal may be received by not the operation unit 215 but the status storage unit 216, and, in response to the trigger signal, the status storage unit 216 may acquire information of the previous operation status from the operation unit 215.

The second decision unit 218 compares information of the present operation status (observed by the status provision unit 217) with information of the operation status stored in the status storage unit 216. When two information do not coincide, the control unit 214 indicates the operation unit 215 to change the present operation status so that the present operation status coincides with the operation status stored in the status storage unit 216.

(Steps)

Figure 3:
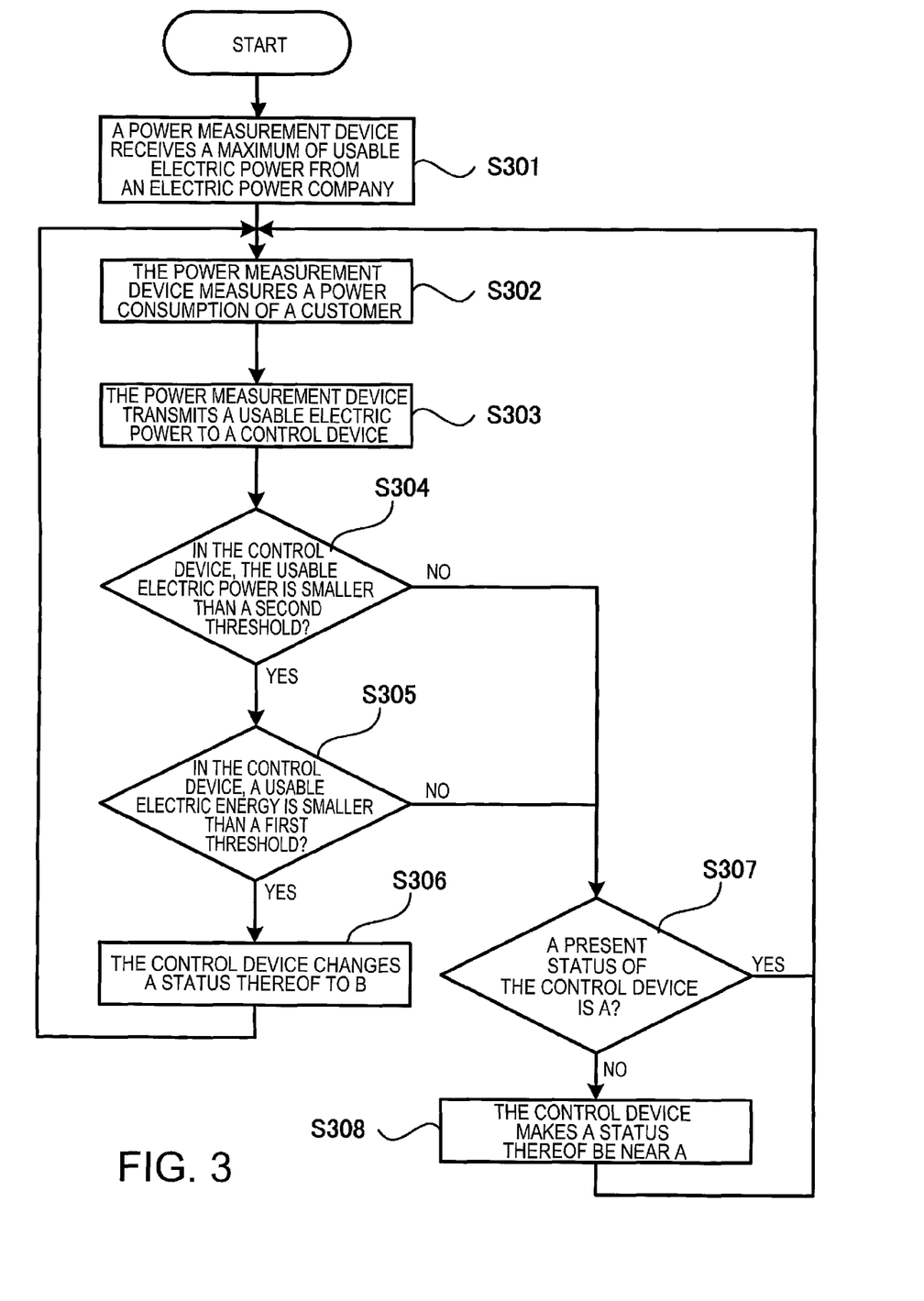
FIG. 3 is a flow chart of processing of the system in FIG. 2.

As to the system having above-mentioned component, an operation thereof is explained by referring to FIG. 3. FIG. 3 is a flow chart of operation of the system according to the present embodiment.

(Operation of the Power Measurement Device 105)

First, operation of the power measurement device 105 is explained by referring to FIG. 3. When the electric power company 106 decides that supply and demand adjustment is necessary, the electric power company 106 transmits a maximum of usable electric power to a house of each customer agreed and contracted to meet a request thereof. Regularly, this value is lower than a maximum of an electric power to be used by the house until that time. The power measurement device 105 of each customer receives this value via the first communication unit 201, and stores this value as a maximum of usable electric power into the maximum storage unit 202 (S301). Alternatively, the electric power company 106 may transmit a request of supply and demand adjustment only. When the power measurement device 105 receives the request, the power measurement device 105 may set a maximum of usable electric power determined by a predetermined contraction, and store the maximum by itself.

In the power measurement device 105, the power measurement unit 203 constantly measures and acquires a power consumption of all the house at the timing (S302). The calculation unit 204 calculates a usable electric power by subtracting the power consumption (acquired by the power measurement unit 203 at S302) from the maximum of usable electric power (stored in the maximum storage unit 202 at 5301), and sends this usable electric power to the second communication unit 205.

In the power measurement device 105, the second communication unit 205 transmits the usable electric power to the communication unit 211 of each control device 101, 102 in the house (S303). As steps of this communication, the power measurement device 105 may periodically broadcast to all control devices 101, 102, or respectively transmit to each control device 101, 102. Alternatively, each control device 101, 102 may inquire the power measurement device 105. In this case, timing and interval of an inquiry may be different for each control device. The usable electric power provided for each control device 101, 102 by the power measurement device 105 is always reflected with the power consumption measured by the power measurement device 203.

(Operation of the Control Devices 101, 102)

Next, after the usable electric power is received, operation of the control devices 101, 102 is explained by referring to FIG. 3.

In order to explain, as the operation status of the control devices 101, 102, a status A and another status B are defined. The status A is defined as an operation status of the control device just before a request of supply and demand adjustment is generated. The status B is defined as an operation status that the power consumption of this control device is the smallest or near thereto. For example, if the control device is an illumination, the status A is a status that the illumination is lighted, and the status B is a status that an intensity of the illumination is most darkened. If the control device is an air conditioner, the status A is a status that the air conditioner operates at a temperature set by a user via a remote controller, and the status B is a status that the temperature of the air conditioner is equal to an indoor temperature. If the user's operation is performed after generating a request of supply and demand adjustment, the status A may be reset as a status after performing the user's operation. Furthermore, the status B is set to respective control devices, and the control device previously stores information of the status B.

In the control device, when the communication unit 211 receives the usable electric power from the power measurement device 105, the electric power storage unit 219 stores the usable electric power in a certain period. The first decision unit 213 compares the usable electric power with a second threshold stored in the threshold storage unit 212 (S304). Furthermore, when the usable electric power is received from the power measurement device 105, contents stored in the electric power storage unit 219 is updated, and the calculation unit 220 calculates a usable electric energy by integrating the usable electric power in a certain period.

When the usable electric power is smaller than a second threshold, the first decision unit 213 compares the usable electric energy with a first threshold stored in the threshold storage unit 212 (S305). When the usable electric energy is smaller than the first threshold, the control unit 214 outputs an indication to the operation unit 215, and changes an operation status of the control device to the status B (S306). When the usable electric power is larger than or equal to the second threshold, or when the usable electric energy is larger than or equal to the first threshold, the second decision unit 218 compares the status A (stored in the status storage unit 216) with the present operation status (provided by the status provision unit 217), and decodes whether the present operation status is same as the status A (S307). When the present operation status is same as the status A, the control unit 214 performs nothing. When the present operation status is not same as the status A, the control unit 214 outputs an indication to gradually return the present operation status to the status A as an original operation status thereof (S308). As to how to make the present operation status be near to the status A, various methods may be used. However, if the operation status of the control device is reset to a lower status (such as switch-off) than the status B by the user's operation, the control unit 214 immediately transfers to the lower status.

(Congestion Control)

At S304~S308 in FIG. 3, by changing the operation status of the control devices 101, 102, the power consumption thereof is adjusted as congestion control of TCP (Transmission Control Protocol). This change of the operation status and the power consumption is explained by referring to FIG. 4.

Figure 4:
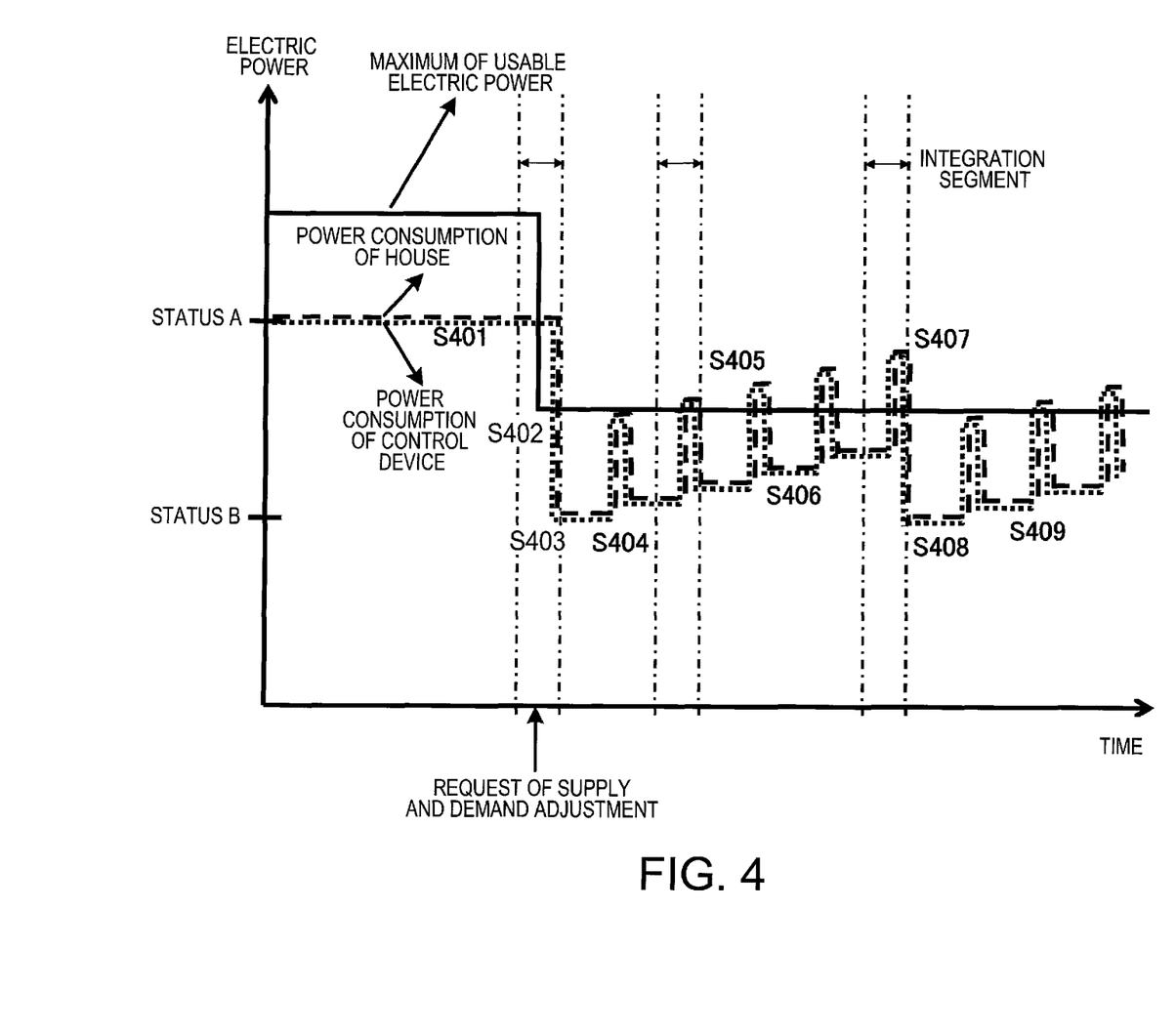
FIG. 4 is one example of a graph representing change of operation status and power consumption.

In order to simplify the examination, the case that a power consumption of the uncontrolled device is always "0", the control device is one unit, and a threshold stored in the control device is "0", is explained. Here, all power consumption of the house is equal to a power consumption of the control device. As an example to change the operation status of the control device, an illumination is imagined. Furthermore, in this illumination, when an operation status thereof is changed to a status that the power consumption is larger (For example, an intensity of the illumination is more brightened), a large electric power is momentarily consumed.

First, the control device is operating under a status A (S401). Here, a power consumption of the house is smaller than a maximum of usable electric power. Accordingly, the usable electric power is larger than "0". In this case, the control device maintains the status A, and performs nothing. For example, if a user makes the illumination be most brightened, the illumination continually maintains this light status.

Next, the electric power company 106 outputs a request of supply and demand adjustment, and a maximum of usable electric power is lowered (S402). Here, the power consumption of the house is larger than the maximum of usable electric power. Accordingly, the usable electric power is smaller than "0". However, a usable electric energy in an integration segment is still larger than "0". As a result, the control device maintains the status A, and performs nothing. After passing time, when the usable electric power and the usable electric energy are respectively smaller than "0", the control device changes the operation status thereof to the status B. By definition of the status B, the power consumption of the control device is lowered (S403). For example, an intensity of the illumination is most darkened.

In the status B, the power consumption of the house is smaller than the maximum of usable electric power. Accordingly, the usable electric power is larger than "0". In this case, the control device gradually changes the operation status to the status A as an original status thereof. Here, a power consumption of the status A is larger than a power consumption of the status B. Accordingly, the power consumption of the control device gradually increases (S404). For example, an intensity of the illumination is gradually brightened.

While the operation status of the control device changes along a direction to increase the power consumption, even if the usable electric power becomes smaller than "0" by momentarily consuming a large electric power, if the usable electric energy is larger than "0", the power consumption of the control device is gradually increased (S406). After gradually increasing the power consumption of the control device, if the usable electric power and the usable electric energy are respectively smaller than "0" (S407), the control device changes the operation status thereof to the status B again (S408). Hereafter, the control device continues the same processing until the operation status thereof is returned to the status A (S409).

If the threshold is larger than "0", change to the status B (represented as S407~S408 in FIG. 4) is executed at earlier phase. The threshold, a change degree of the operation status (a ratio to increase the power consumption at S404, S406, S409), and the status B, may be a fixed value set at shipment timing for each type or model of the control device, may be adjusted/set by a user via an external setting means (not shown in Fig.) equipped with the control device, or may be dynamically set by the control device itself.

As to how to set these values, the same method as various congestion control methods of TCP can be applied. In congestion control of TCP, when congestion does not occur and a packet is not lost, a network is regarded to have an idle band, and a transfer rate thereof is heightened by increasing a window size (packet transmission rate). Conversely, when congestion occurs and a packet is lost, in order to avoid the congestion, the transmission rate is lowered by decreasing the window size. As an adjustment method in case of the congestion, such as how to decrease the window size and how to increase the window size after that, various methods are proposed and realized. Change of transfer rate in TCP congestion control can be regarded as change of the power consumption in the present embodiment. For example, occurrence of congestion is regarded as S407 in FIG. 4, decrease of the window size after occurring congestion is regarded as S408, and increase of the window size after that is regarded as S409.

Even if the power consumption of the house increases by the uncontrolled device operating or starting to operate, by the same control method as FIGS. 3 and 4, the control device autonomously lowers the power consumption thereof. As a result, the power consumption of the house can be controlled by autonomous distributed control of the control device. Furthermore, this operation is not over-controlled by the control device.

(A Plurality of Control Devices Including a Power Generation Device)

Next, in a house including a plurality of control devices 101, 102 having a power generation function, an operation example thereof is explained. The control devices 101, 102, respectively operate according to a flow chart of FIG. 3.

(Power Generation Device)

In the control device having a power generation function, the status B is defined as a status that the device generates the electric power as large as possible. For example, in case of a battery already charged, the status A is a status not discharging, and the status B is a status discharging the largest electric power.

Figure 5:
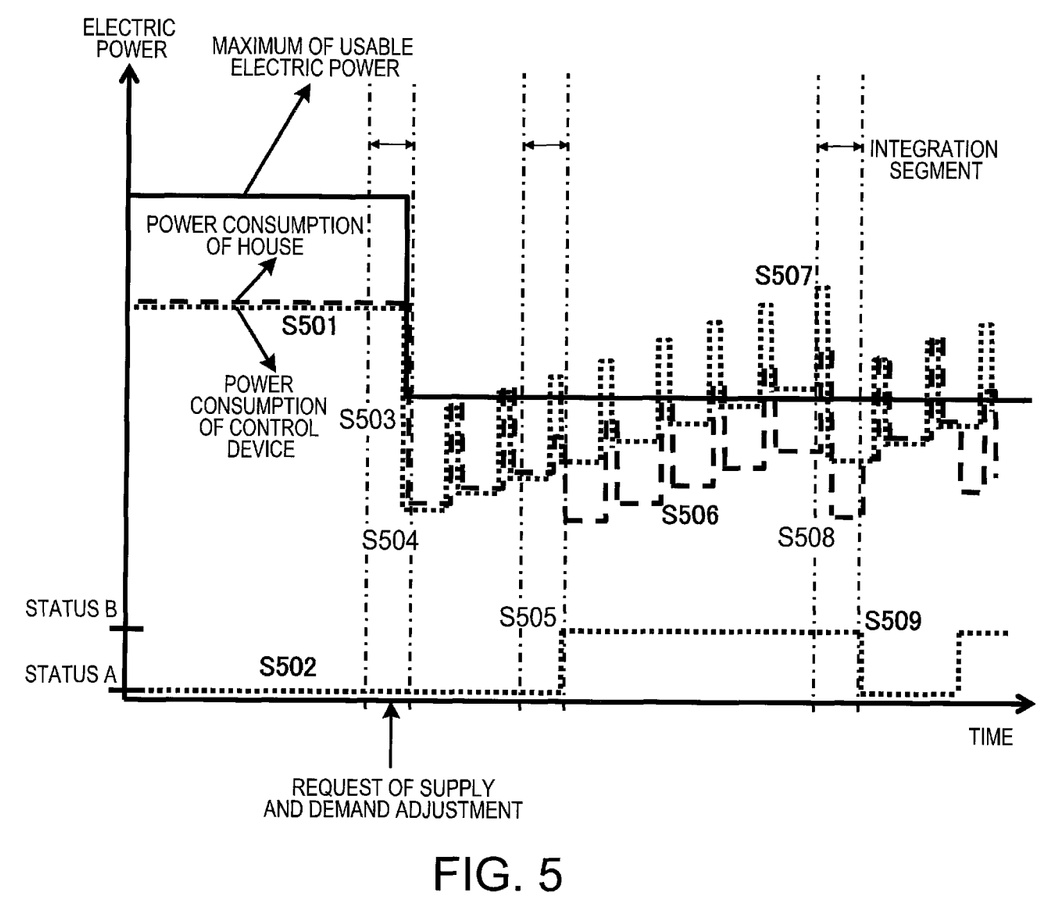
FIG. 5 is one example of a graph representing change of operation status and power consumption in the control device having a power generation function.

In an illumination (the control device) and a battery already charged, when a request of supply and demand adjustment is generated, how the illumination and the battery have changed respectively, and how the power consumption (a value that a discharged electric power of the battery is subtracted from the power consumption of the illumination) of the house has changed, are explained by referring to FIG. 5.

First, the illumination is lightened (S501), and the battery is under the status A (not discharging) (S502). In this case, the power consumption of the house is equal to the power consumption of the illumination.

Next, the electric power company 106 outputs a request of supply and demand adjustment, and a maximum of usable electric power is lowered (S503). The illumination and the battery detect this change at respective timings. Here, assume that the illumination first reacts to lower the power consumption thereof (S504). As a result, the power consumption of the house becomes smaller than the maximum of usable electric power.

After that, in the same way as explanation of FIG. 4, the illumination gradually heightens the power consumption thereof. The illumination and the battery always monitor whether the usable electric power and the usable electric energy are smaller than respective thresholds (stored in the control devices individually). Here, assume that a threshold P2 stored in the battery is larger than a threshold P3 stored in the illumination. Accordingly, at a timing when the usable electric power is smaller than the threshold P2, the battery transits to the status B, i.e., a discharge status (S505).

By discharge from the battery, the power consumption of the house drops once. However, the illumination continually heightens the power consumption thereof. Accordingly, the power consumption of the house rises again (S506). When the usable electric power and the usable electric energy are smaller than respective thresholds stored in the illumination (S507), the illumination lowers the power consumption thereof (S508).

As a result, the power consumption of the house drops, and the usable electric power becomes larger than a threshold stored in the battery. Accordingly, the battery transits to the status A, i.e., stops discharging (S509).

Hereafter, when the power consumption of the illumination gradually rises, the battery discharges again. These steps are repeated. In FIG. 5, the illumination and the battery individually operate. However, the power consumption of the house can be controlled by autonomous distribute control of the control device. This operation is not over-controlled by the control device. Furthermore, in many cases, because of difference between respective thresholds, discharge from the battery is performed before the power consumption of the illumination is adjusted. Briefly, a priority can be generally assigned to a plurality of control devices.

According to at least one control device of above-mentioned embodiment, when the power consumption of the device momentarily rises, the electric power is not adjusted. Accordingly, damage for the user's comfortableness can be avoided.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device for communicating with a power measurement device, comprising:
    a communication unit configured to receive a usable electric power from the power measurement device;
    a threshold storage to store a first threshold and a second threshold;
    a calculation unit configured to calculate a usable electric energy by integrating the usable electric power; and
    a control unit configured to change an operation status of the control device based on a comparison result between the usable electric energy and the first threshold, and a comparison result between the usable electric power and the second threshold.

2. The control device according to claim 1, wherein,
    when the usable electric energy is smaller than the first threshold,
    the control unit changes the operation status so as to lower a power consumption of the control device once.

3. The control device according to claim 1, wherein,
    when the usable electric energy is smaller than the first threshold and when the usable electric power is smaller than the second threshold,
    the control device changes the operation status so as to lower a power consumption of the control device once.

4. The control device according to claim 2, wherein,
    when the usable electric energy is smaller than the first threshold,
    the control unit changes the operation status so as to gradually raise the power consumption after changing the operation status so as to lower the power consumption.

5. The control device according to claim 4, wherein the control unit changes the operation status so as to gradually raise the power consumption by a method for controlling congestion of TCP (Transmission Control Protocol).

6. The control device according to claim 1, wherein, if the control device has a power generation function or a discharge function,
when the usable electric energy is smaller than the first threshold,
the control unit changes the operation status so as to raise a generated electric power or a discharged electric power, instead of lowering the power consumption.

7. A control method used for a control device that communicates with a power measurement device, comprising:
receiving a usable electric power from the power measurement device;
calculating a usable electric energy by integrating the usable electric power;
changing an operation status of the control device based on a comparison result between the usable electric energy and a first threshold stored in a threshold storage, and a comparison result between the usable electric power and a second threshold stored in the threshold storage; and
when the usable electric energy is smaller than the first threshold and when the usable electric power is smaller than the second threshold, changing the operation status so as to lower a power consumption of the control device once.

8. A non-transitory computer readable medium for causing a computer to perform a control method used for a control device that communicates with a power measurement device, the control method comprising:
receiving a usable electric power from the power measurement device;
calculating a usable electric energy by integrating the usable electric power;
changing an operation status of the control device based on a comparison result between the usable electric energy and a first threshold stored in a threshold storage, and a comparison result between the usable electric power and a second threshold stored in the threshold storage; and
when the usable electric energy is smaller than the first threshold and when the usable electric power is smaller than the second threshold, changing the operation status so as to lower a power consumption of the control device once.

* * * * *